Figure 1:
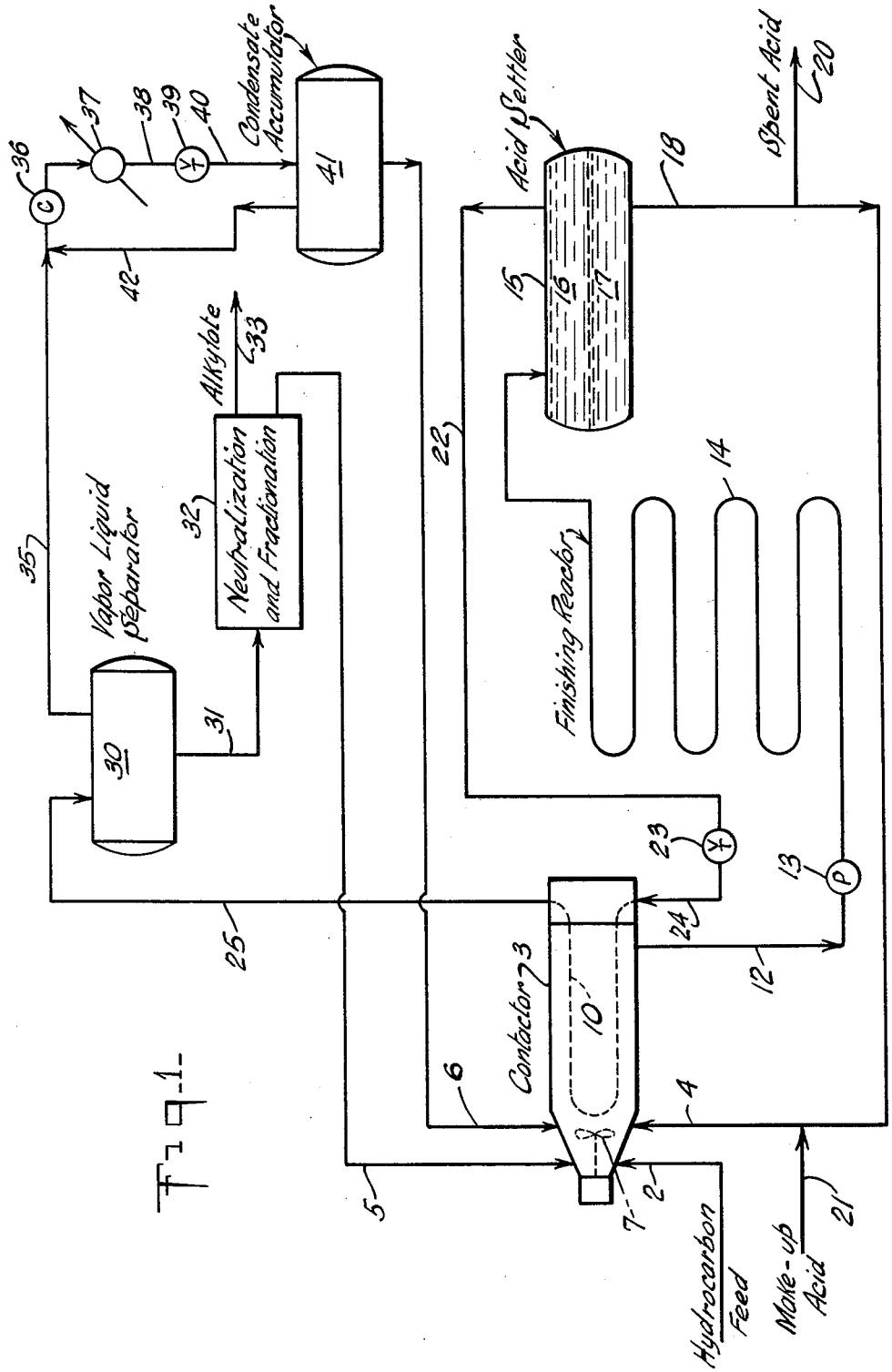

March 26, 1963    A. R. GOLDSBY ETAL    3,083,247
ALKYLATION PROCESS
Filed Dec. 7, 1959    2 Sheets-Sheet 1

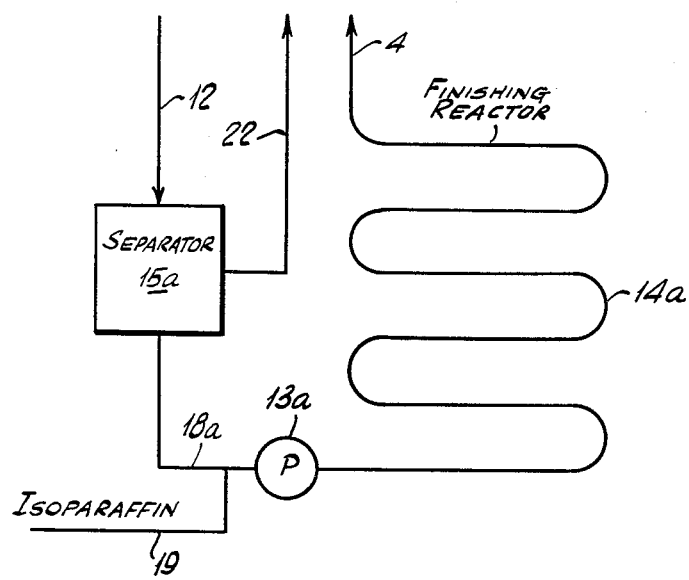

United States Patent Office 3,083,247
Patented Mar. 26, 1963

3,083,247
ALKYLATION PROCESS
Arthur R. Goldsby, Chappaqua, and Howard H. Gross, Pleasantville, N.Y., assignors to Texaco Development Corporation, New York, N.Y., a corporation of Delaware
Filed Dec. 7, 1959, Ser. No. 857,717
4 Claims. (Cl. 260—683.46)

This invention is directed to a method of reacting olefin based alkylatable material and isoparaffin in the presence of an alkylation catalyst and more particularly to such an alkylation process wherein at least a part of the aforesaid reaction is effected in once through linear flow in an elongated reaction zone whereby intermediate reaction products are effectively converted to alkylate.

Alkylation of olefinic materials with isoparaffins is employed extensively for the production of high octane number fuels. The alkylation reaction is effected in the liquid phase in the presence of a liquid catalyst. The alkylation reaction is directed to the production of a maximum yield of high product quality alkylate with minimum catalyst consumption by maintaining desirable operating conditions including conditions of intimate mixing, low temperature, and high ratio of isoparaffin to olefin. Intimate contact of the reactants and catalyst is effected by intensive mixing forming an emulsion of liquid hydrocarbon and catalyst. The alkylation reaction temperature is desirably maintained within a range of about 35 to 75° F. It is necessary to refrigerate the reactants and reaction mixture to maintain a desirable reaction temperature since a large amount of heat is liberated as the heat of reaction of the olefin and isoparaffin. Mixing is typically obtained by rapid circulation of the reaction mixture by means of pumps as in pump and tank systems or by means of impellers or jets in internal circulating systems. Refrigeration may be provided by autorefrigeration, effluent refrigeration or external refrigeration as is well known in the art. In all of these systems, an emulsion of the reaction mixture is formed and circulated in the reaction zone. Reactant hydrocarbons and catalyst are continuously added to the reaction mixture, and a portion of the emulsion is continuously withdrawn. The emulsion which is withdrawn is separated into catalyst and hydrocarbon phases; the catalyst phase is recycled and alkylate product is recovered from the hydrocarbon phase.

In the alkylation reaction, it is postulated that the olefinic material reacts with the catalyst forming an acid ester as an intermediate product and that this intermediate product then reacts with isoparaffin releasing the catalyst and forming alkylate. Although the alkylation reaction is rapid and proceeds substantially to completion in the reaction systems described above wherein reactants are continuously added to circulating emulsion, the acid ester intermediate product is presented in the catalyst phase of the emulsion. As a result, a part of the olefin feed, for example, up to about 10 percent of the olefin feed, may appear as the acid ester intermediate product in the emulsion phase which is withdrawn from the reaction zone in prior art processes. Since the hydrocarbon fraction rich in isobutane is no longer in intimate contact with the bulk of the acid after coalescence of the acid in the settler, these intermediate products tend to react further with the catalyst by conjunct polymerization effecting degradation of the catalyst and the formation of hydrocarbons of poor fuel quality. This undesirable reaction in the settler is evidenced by a temperature rise which may be as much as 5 to 10° F.

In accordance with the process of this invention, emulsion of hydrocarbon reactants and catalyst containing intermediate reaction products is passed to a finishing reaction zone wherein the reaction proceeds without the addition of further olefinic material or the mixing of unconsumed intermediate fractions with the product discharged from the reaction zone. Progressive reaction of the intermediate reaction product is effected by passing emulsion, the hydrocarbon portion of which contains a high proportion of isoparaffinic material, in a single pass through an elongated reaction zone, for example, a tubular, pipe or coil reactor. As the reaction mixture passes through the elongated zone, the intermediate product continues to react with the isobutane present effecting a continuous decrease or diminution of the unreacted or incompletely reacted material. Advantageously, turbulent flow conditions are maintained in the elongated reaction zone by employing high linear velocities thereby maintaining intense mixing and intimate contact of the reactants and catalyst. Although high turbulence is achieved, back-mixing of reaction products with incompletely reacted feed material is substantially avoided by virtue of the single pass lineal flow employed.

In the catalytic alkylation of olefins with isoparaffins, a preponderance if isoparaffin (typically about 60 to 80 volume per cent or more of the hydrocarbons in the reaction mixture) over olefin material and hydrocarbon diluents is used to direct the reaction towards production of the most value aviation or automotive fuels. Consequently a large quantity of isoparaffin must be recovered and recycled for reuse in the process. Isobutane is generally used as the isoparaffin for the manufacture of aviation or motor fuels although other isoparaffins, for example isopentane, may be employed.

The alkylatable material for reacting with isoparaffin is olefin-based, that is, it is generally an olefinic hydrocarbon itself such as propylene, butylene or the like, but it also can be an alkyl sulfate (as obtained for example in a so-called "two stage" process wherein an olefinic hydrocarbon is absorbed in sulfuric acid as a first stage in the alkylation operation).

In catalytic alkylation, the mol ratio of isoparaffin to olefin-based material supplied to the alkylation zone is maintained substantially in excess of 1 to 1, and preferably within the range of about 4 to about 20 to 1. The catalyst to liquid hydrocarbon volume ratio is maintained within the range of about 0.5 to 1 to about 5 to 1 and preferably within the range of about 1 to 1 to about 3 to 1. Catalyst strength is maintained of at least about 88 percent when sulfuric acid is used. A liquid catalyst which is non-volatile under alkylation reaction conditions, for example, sulfuric acid, is preferred. Sulfuric acid strength is maintained within the range of about 88 to 95 percent by purging spent acid from the system and by adding make-up acid of about 98.0 to 99.9 percent purity.

An important part of the isobutane employed in alkylation processing is a recycle stream produced by fractional distillation of alkylation products in a deisobutanizing fractional distillation zone, the isobutane being recovered as a distillate fraction of high isobutane concentration, for example, about 85 to 95 liquid volume percent isobutane. The higher-boiling alkylate in such distillation zone is recovered in the liquid bottoms fraction. This liquid bottoms fraction may be fractionated in conventional manner to separate light ends and alkylate fractions for use as fuel blending stocks. In the usual deisobutanizing fractional distillation operation, isobutane distillate is returned to the top of the distilling column as reflux at a high reflux ratio, for example 4 to 1, to maintain high isobutane purity in the distillate.

In accordance with the process of this invention at least a part of the alkylation reaction is effected in a single pass through an elongated reaction zone. All the functions required in an alkylation system of forming an emulsion, absorbing the heat of reaction and providing sufficient reaction time may be provided in an elongated reaction zone. For example, intimate mixing effective to form and maintain an emulsion may be achieved by employing velocities corresponding to Reynolds numbers above 2000. Absorption of the heat of reaction may be effected by externally cooling the reaction zone, for example the elongated reaction zone may comprise a number of passes through the tubes of a shell and tube heat exchanger employing coolant in the shell side of the exchanger. In another method of cooling, cold hydrocarbon, for example, isoparaffin reactant, may be introduced at several points along the reaction zone. Reaction time is provided by the use of a reaction zone of sufficient length, for example, at a flow rate of about 20 feet per second, a reaction time of one minute is provided in a coil 1200 feet in length.

In a preferred embodiment of our process the reactants are initially contacted in conventional reaction systems employing circulation of the reaction mixture and a portion of the reaction mixture is withdrawn and finished in single pass flow through an elongated reaction zone. For example, the emulsion is formed and most of the reaction is effected in conventional equipment which is adapted to the removal of the heat of reaction, for example, pump and tank, impeller or jet mixed reactors, employing autorefrigeration, effluent refrigeration or external refrigeration. The amount of reaction occurring in the elongated finishing reaction zone is relatively small, little heat of reaction is liberated, and the finishing reactor may be operated without encountering excessive temperature rise even though no cooling is provided. In the effluent of the first stage conventional reaction system, the catalyst contains alkyl acid sulphate within the range of about 0.5 to 4.0 weight percent. After treatment in the second stage elongated reaction zone in accordance with the process of this invention, the catalyst contains alkyl acid sulfate within the range of about 0 to 0.5 weight percent.

In one embodiment of our invention illustrated in FIGURE 2, the emulsion from the primary reaction zone may be separated into hydrocarbon and catalyst phases and only the catalyst phase is passed with additional isoparaffin through an elongated finishing reaction zone. In this case, it is preferred to employ an accelerated separation technique, for example centrifugation, for separation of the catalyst and hydrocarbon from the primary reaction zone. The isoparaffin added to the finishing zone may be rapidly emulsified with the catalyst by the use of turbulent flow velocities. Emulsion from the finishing zone may be returned directly to the primary reaction zone or may be separated into hydrocarbon and catalyst phases for separation of the alkylate.

An advantage of the process of this invention is that intermediate reaction products are efficiently converted to high quality alkylate.

Another advantage of this invention is that catalyst degradation resulting from reaction of intermediate products in the catalyst separator is avoided.

Another advantage of this process is that a reaction zone may be fabricated of inexpensive pipe or tubular material.

Another advantage of the process of this invention is that the catalyst recycle stream before introduction into the primary alkylation zone is preconditioned by contact with a stream of high relative isoparaffin content as compared with other reactants and reaction products.

Another advantage of the process of this invention is that intense mixing may be effected by turbulent flow.

The accompanying drawings diagrammatically illustrate the process of this invention. Although the drawings illustrate arrangements of apparatus in which the process of this invention may be practiced, it is not intended to limit the invention to the particular apparatus or material described. FIGURE 1 illustrates a method in which reactor effluent is passed through a finishing reactor and effluent of the finishing reactor is separated into catalyst and hydrocarbon phases. FIGURE 2 illustrates a modification of the method of FIGURE 1 wherein reactor effluent is separated into hydrocarbon and catalyst phases and the separated catalyst and added isoparaffin are passed through a finishing reactor.

Referring to FIGURE 1, a hydrocarbon feed comprising olefinic and paraffinic hydrocarbons, for example, a butylene fraction from catalytic cracking, is introduced through line 2 into contactor 3. Catalyst, for example, sulfuric acid in line 4 is isobutane recycle streams in lines 5 and 6 are also passed to contactor 3. The contents of contactor 3 are circulated rapidly by impeller 7 effecting formation of an emulsion of hydrocarbons and catalyst. The emulsion circulated in contactor 3 is cooled by heat exchange coil 10. A portion of the circulating emulsion is withdrawn through line 12 and discharged by pump 13 at high velocity through finishing reactor coil 14. Incompletely reacted olefin in the form of intermediate reaction products present in the acid phase of the emulsion withdrawn through line 12 react with the excess of isobutane present in coil 14.

The effluent from coil 14 is discharged into settler 15. Settler 15 is a quiescent zone wherein hydrocarbon and acid catalyst phases separate, the lighter hydrocarbon phase rising to the top as indicated by numeral 16 and the heavier acid catalyst phase settling to the bottom as indicated by numeral 17. Acid catalyst is withdrawn through line 18 and recirculated to the contactor 3 through line 4. Spent acid is withdrawn through line 20 and make-up acid added through line 21 to maintain the concentration of the acid in the system at a desired level. Hydrocarbon liquid is withdrawn from settler 15 through line 22 and passed through throttle valve 23 wherein the pressure is reduced effecting concomitant vaporization of a part of the hydrocarbon and chilling of the resultant liquid-vapor mixture. The chilled liquid-vapor mixture is discharged through line 24 to cooling coil 10 in contactor 3 to provide refrigeration and absorption of the heat liberated therein. Effluent from cooling coil 10 is discharged through line 25 to vapor separator 30. Liquid separated in separator 30 comprising product alkylate and unreacted isobutane is withdrawn through line 31 to neutralization and fractionation facility 32. Alkylate is discharged through line 33 for use as high octane motor or aviation fuel. Recovered isobutane from neutralization and fractionation facility 32 is recycled through line 5 to contactor 3.

Vapor from separator 30 consisting substantially of isobutane is withdrawn through line 35 and is condensed by means of compressor 36 and cooler 37. Condensate in line 38 is flashed by passing through throttle valve 39 effecting partial vaporization and chilling of the condensate. Vapor and chilled condensate are passed through line 40 to condensate accumulator 41. Vapor from accumulator 41 is withdrawn through line 42 and recycled through line 35 by compressor 36. Chilled condensate is withdrawn through line 6 for recycle to the contactor 3.

Referring to FIGURE 2, contactor effluent is passed through line 12 directly to separator 15a. Separator 15a may be a gravity settler or a separator employing an accelerated separating technique, for example, a centrifuge. Hyrocarbon separated from the contactor effluent is discharged through line 22 as shown in FIGURE 1. Catalyst from separator 15a is discharged through line 18a. Isoparaffin in line 19 is admixed with the separated catalyst and the mixture is passed by pump 13a through finishing reactor 14a. Effluent of finishing reactor 14a is discharged through line 4 and returned directly to the alkylation zone.

*Example*

In the following example flow rates are given in barrels (42 gallons) of liquid per hour regardless of whether the stream is in the liquid or vapor state. All compositions are given in mol percent.

Fresh feed comprising olefin and isobutane feed streams is provided at a rate of 63 barrels per hour having the following compositions:

| | |
|---|---|
| Ethane and ethylene | 0.2 |
| Propylene | 21.6 |
| Propane | 15.8 |
| Isobutane | 31.0 |
| Butylenes | 21.8 |
| Normal butane | 8.6 |
| Pentane | 1.0 |
| | 100.0 |

The fresh feed is admixed with 84.3 barrels per hour of recovered isobutane containing 89 percent isobutane and 152 barrels per hour of condensate containing 80 percent isobutane and charged to an impeller type contactor. In addition 299 barrels per hour of sulfuric acid catalyst is introduced into the alkylation contactor. The catalyst is maintained at a sulfuric acid concentration of about 90.0 percent sulfuric acid by withdrawing used acid as necessary and adding make-up acid of 99.5 percent purity. The hydrocarbon and acid are emulsified in the contactor and the resulting reaction mixture is cooled by coils immersed in the contactor. A portion of the emulsion is withdrawn from the contactor as a stream of 571 barrels per hour. The acid phase of the emulsion contains about 0.91 weight percent alkyl acid sulfate. The emulsion is pumped at a velocity of about 4.5 feet per second through a reaction coil consisting of 266 feet of 6 inch diameter tubing and discharged directly into a separator. The alkyl acid sulfate content of the emulsion discharged to the separator is 0.2 weight percent.

Acid catalyst is withdrawn from the settler and recycled to the contactor. Liquid hydrocarbon from the settler is passed through a pressure reduction valve effecting partial vaporization and chilling of resultant liquid and vapor and the chilled liquid vapor mixture is passed in indirect heat exchange with the contents of the reaction zone. Effluent from the cooling coils is discharged into a liquid vapor separator from which is withdrawn 139 barrels per hour of liquid comprising crude alkylate and unreacted hydrocarbons. The crude alkylate mixture is neutralized and is then fractionated in admixture with 38.0 barrels per hour of an extraneous butane stream comprising about 55.9 percent normal butane and 38.0 percent isobutane to separate 48.2 barrels per hour of alkylate, 25.5 barrels per hour of normal butane and 84.3 barrels per hour of recovered isobutane which is recycled to the alkylation contactor. Vapor from the refrigeration coils is condensed, depropanized, and autorefrigerated to produce a recycle stream of 152 barrels per hour of chilled isobutane condensate.

Obviously many modifications and variations of the invention as hereinbefore set forth may be made without departing from the spirit and scope thereof and only such limitations should be imposed as are indicated in the appended claims.

We claim:
1. In an alkylation process wherein olefin-based alkylatable material and isoparaffin are reacted in the presence of a sulfuric acid alkylation catalyst, the improvement which comprises: introducing feed comprising said olefin-based alkylatable material, said isoparaffin, and said alkylation catalyst into a first reaction zone, circulating the reaction mixture in said first reaction zone thereby effecting mixing of said feed and said reaction mixture and alkylation of a substantial proportion of said olefin-based alkylatable material, withdrawing a portion of said reaction mixture as effluent from said first reaction zone, said effluent from said first reaction zone comprising alkylation catalyst containing within the range of 0.5 to 4.0 weight percent of alkyl acid sulphate, passing said effluent from said first reaction zone to a separating zone, separating said effluent from said first reaction zone into a separated hydrocarbon phase and a separated catalyst phase, adding isoparaffin to said separated catalyst phase, passing said separated catalyst phase in admixture with said added isoparaffin in once through lineal flow through an elongated reaction zone providing a reaction time of at least 1.0 minute, discharging the effluent from said elongated reaction zone, said effluent from said elongated reaction zone comprising alkylation catalyst containing within the range of 0 to 0.5 weight percent of alkyl acid sulphate, recycling at least a portion of said effluent from said elongated reaction zone to said first reaction zone, and recovering alkylate from said separated liquid hydrocarbon phase.

2. The process of claim 1 wherein said first reaction zone is maintained at a temperature within the range of 35 to 75° F.

3. The process of claim 2 wherein said temperature is maintained by evaporating a part of said reaction mixture.

4. In an alkylation process wherein olefin-based alkylatable material and isoparaffin are reacted in the presence of a sulfuric acid alkylation catalyst in a reaction zone containing a reaction mixture comprising an emulsion of reactants, diluents, and catalyst, the contents of said reaction zone are subjected to mixing whereby the reaction mixture is maintained of substantially uniform composition throughout said reaction zone, feed comprising said olefin-based alkylatable material, said isoparaffin, and said alkylation catalyst is continuously introduced into said reaction zone, and effluent comprising a part of said reaction mixture is withdrawn from said reaction zone, the improvement which comprises passing said effluent from said reaction zone to a separating zone effecting separation of said effluent from said reaction zone into a catalyst phase containing within the range of 0.5 to 4.0 weight percent alkyl acid sulfate and a hydrocarbon phase, adding isoparaffin to said separated catalyst phase, passing said catalyst phase in admixture with said added isoparaffin through an elongated supplementary reaction zone in lineal once through flow at a velocity effective to produce turbulent flow for a time of at least about 1.0 minute reducing the alkyl acid sulfate content of said catalyst phase to within the range of 0 to 0.5 weight percent, passing at least a portion of the effluent from said supplementary reaction zone to said reaction zone, and recovering alkylate from said hydrocarbon phase.

References Cited in the file of this patent

UNITED STATES PATENTS

| | | |
|---|---|---|
| 2,245,038 | Holm et al. | June 10, 1941 |
| 2,271,860 | Goldsby | Feb. 3, 1942 |
| 2,322,482 | Stahly et al. | June 22, 1943 |
| 2,618,669 | Mrstik | Nov. 18, 1952 |
| 2,717,913 | Rollman | Sept. 13, 1955 |
| 2,833,840 | Longwell | May 6, 1958 |
| 2,855,449 | Owen | Oct. 7, 1958 |